United States Patent [19]

Hiraoka et al.

[11] Patent Number: 4,960,221

[45] Date of Patent: Oct. 2, 1990

[54] PRESSURE VESSEL

[76] Inventors: Eiichi Hiraoka, 50-17-A-13, Kamikitazawa-5-chome, Setagaya-ku, Tokyo; Junji Onaka, 16-7, Kuboinari-4-chome, Iruma-shi, both of Japan

[21] Appl. No.: 357,574

[22] Filed: May 26, 1989

[30] Foreign Application Priority Data

Jun. 21, 1988 [JP] Japan .................... 63-81153[U]

[51] Int. Cl.⁵ ............................................ B65D 53/02
[52] U.S. Cl. ........................................ 220/3; 220/674; 220/646
[58] Field of Search ................ 220/3, 8, 72, 70, 408

[56] References Cited

U.S. PATENT DOCUMENTS

| | | | |
|---|---|---|---|
| 2,899,563 | 8/1959 | Stellmacher | 220/8 |
| 3,411,655 | 11/1968 | Gaines | 220/3 |
| 3,779,421 | 12/1973 | Brown | 220/3 |
| 3,942,668 | 3/1976 | Eberle | 220/8 |
| 4,546,895 | 10/1985 | Pflederer | 220/3 |
| 4,709,831 | 12/1987 | Coplan | 220/3 |
| 4,865,210 | 9/1989 | Brainard | 220/3 |

Primary Examiner—Stephen Marcus
Assistant Examiner—S. Castellano

[57] ABSTRACT

A pressure vessel comprising a hollow cylindrical member and a cylindrical body section slidably fitted into the cylindrical member, the body section being formed as an integral member consisting of disc-like end-wall sections provided at its ends and a middle section which is cut out along two planes which are substantially parallel to the axial direction to define a specimen accommodating space. This structure allows for a simplified strength calculation during the design of a high-pressure vessel and provides an enlarged specimen accommodating space.

1 Claim, 3 Drawing Sheets

PRESSURE VESSEL

BACKGROUND OF THE INVENTION

1. Field of the Invention

This invention relates to a pressure vessel used under high operating pressures of 200 to 300 kg/cm$^2$G, such as an extraction vessel which constitutes the main equipment of an apparatus for executing supercritical extraction.

2. Description of the Prior Art

The applicant of the present invention previously invented a pressure vessel and filed a patent application for it (Japanese Patent Unexamined Publication No. 63-158396, hereinafter referred to as "prior art invention"). As shown in FIGS. 4 and 5, the pressure vessel of this prior art invention comprises a cylindrical member a constituting the housing of the vessel, and two covers b respectively fitted into openings provided at both ends of the cylindrical member a, the two covers b being connected to each other through the intermediary of tie rods c to form an integrated unit which is slidable within the cylindrical member a.

As shown in FIG. 5, the integrated unit of the above-described prior art invention is formed by connecting the two covers b by means of three tie rods c. However, this results in a cross section which is asymmetrical in the vertical direction. Consequently, calculation of the structural strength of a high-pressure vessel, which is an indispensable aspect of the design thereof, is inevitably rather complicated.

If the tie rods c are connected to the covers b by means of screw sections d, as shown in FIG. 7, the screw sections d must be designed to be large. This, however, affects the strength. To cope with this, it is necessary for the overall structure to have a considerable size. This, in turn, results in the thickness t of the whole being rather too large.

If, as shown in FIG. 8, large screw holes e are provided in the covers b and the covers b and the tie rods c are connected to each other by means of nuts f, the engagement sections will influence the strength, so that thickness t of the covers b has to be large. Moreover, it is not easy for gaskets g alone to effectively seal the screw sections.

It might be considered possible to connect the tie rods c to the covers b by means of welding, as shown in FIG. 9. However, it is not possible for the welded sections h alone to withstand the great load imposed on them by the high pressure involved.

SUMMARY OF THE INVENTION

It is accordingly an object of this invention to eliminate the problems experienced with the above-described prior invention of the type in which the covers b,b at the ends thereof are integrated with each other by means of the tie rods c, and to provide a pressure vessel which facilitates strength calculations and which includes a large accommodating space.

In accordance with this invention, there is provided a pressure vessel comprising a cylindrical member constituting the housing of the vessel, and a body section which can be inserted into the cylindrical member at openings provided at its ends, said body section consisting of a cylindrical body whose middle section is cut out along parallel planes to form a vertically symmetrical, integral member that is slidable within the cylindrical member.

DETAILED DESCRIPTION OF THE PREFERRED EMBODIMENTS

Figure 1:
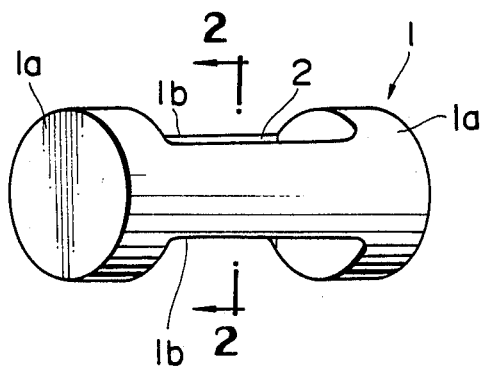
FIG. 1 is a perspective view of the body section of the pressure vessel of this invention.
Figure 2:
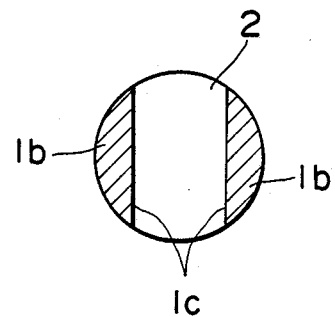
FIG. 2 is a sectional view taken along the line II—II of FIG. 1.

An embodiment of this invention will now be described with reference to the attached drawings. FIG. 1 shows a body section 1 of a pressure vessel in accordance with this invention. The body section 1 is composed of end-wall sections 1a,1a which correspond to the covers b in the prior art invention and connecting sections 1b,1b which correspond to the tie rods c of the same. The connecting sections 1b,1b are formed integrally with the end-wall sections 1a,1a and are defined, as shown in FIG. 2, by two parallel planes 1c,1c along which the cylindrical body constituting the body section 1 is cut out to provide a configuration which is symmetrical in the vertical direction. The accommodating space 2, therefore, when viewed in cross-section as shown in FIG. 2, is defined by a pair of substantially parallel lines 1c,1c and a pair of diametrically opposed circular sections (unnumbered).

The cross-sectional area of the connecting sections 1b,1b left after cutting out along the parallel planes is equal to the sum of the cross-sectional areas of the tie rods c in the prior art invention.

Figure 3:
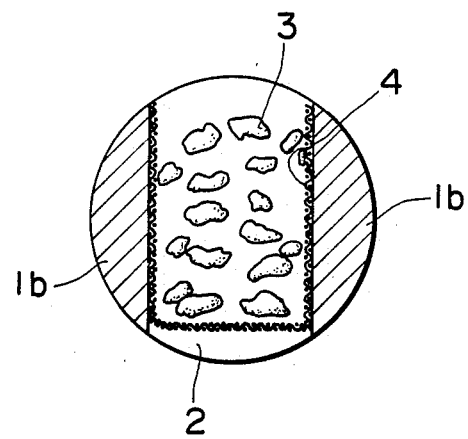
FIG. 3 is a sectional view showing the state in which a basket is lodged in the specimen accommodating space of the body section.
Figure 4:
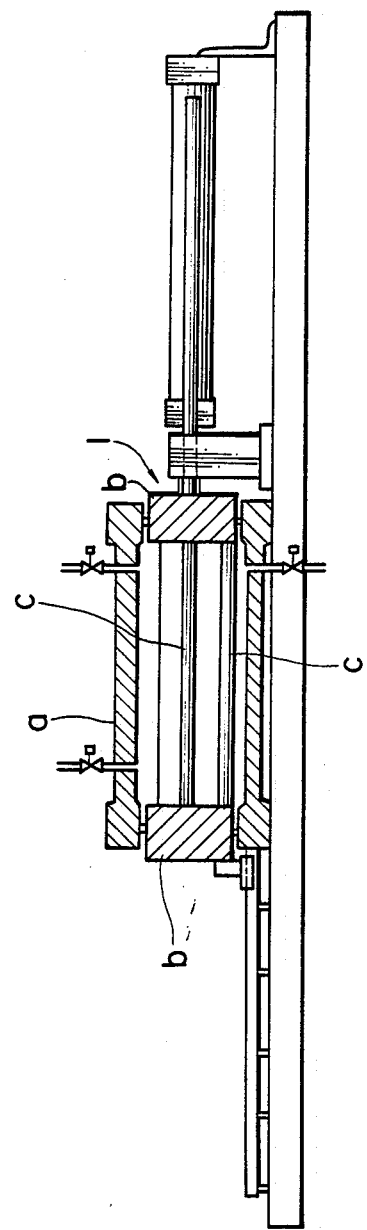
FIG. 4 is a schematic view illustrating the prior art invention.

FIG. 3 shows the state in which a gauze basket 4 containing specimens 3 is lodged in a specimen accommodating space 2 of the body section 1, which is inserted in this condition into the cylindrical member.

Figure 6:
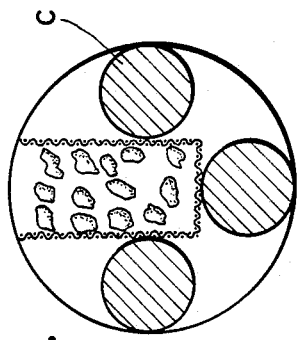
FIG. 6 is a sectional view showing the state in which a basket is lodged in the specimen accommodating space of the body section in the prior art invention.
Figure 5:
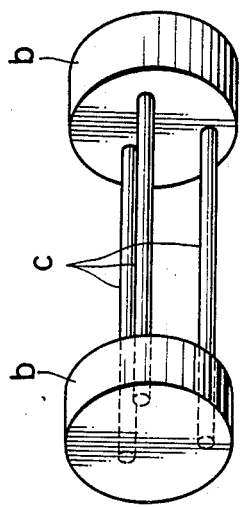
FIG. 5 is a perspective view of the body section in the prior art invention.
Figure 7:
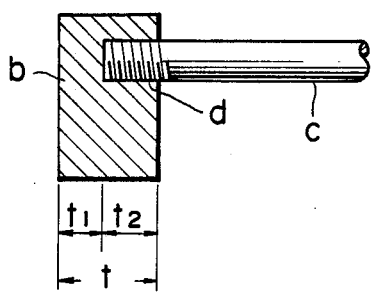
FIGS. 7 to 9 are views illustrating connecting structures provided between the tie rods and the covers.
Figure 8:
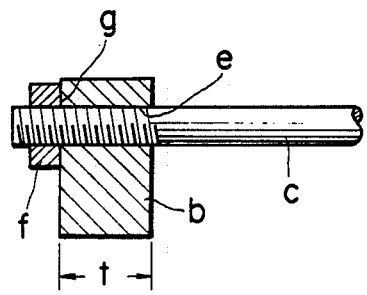
Figure 9:
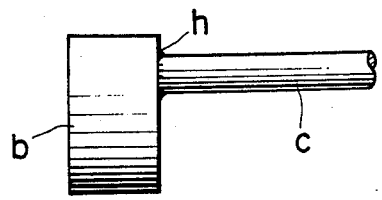

FIG. 6 shows the way the specimens are set in the pressure vessel of the prior art invention. The presence of the tie rods c thus renders the specimen accommodating space very narrow, whereas the specimen accommodating space 2 of this invention is considerably large, the connecting sections 1b,1b playing the role of the tie rods c.

Furthermore, the vertically symmetrical configuration obtained by cutting out the cylindrical body along the parallel planes 1c,1c allows for a simplified strength calculation which can be easily done during the design of pressure vessels.

In addition, since the end-wall sections and the connecting sections are integrally formed, no such connecting problems as mentioned with respect to the prior art invention are involved.

What is claimed is:

1. A pressure vessel comprising a hollow cylindrical member and a cylindrical body section slidably fitted into said cylindrical member in an axial direction, said body section being formed as an integral member comprising disc-like end-wall sections provided at the ends of said body section and a middle section which is cut out along two planes substantially parallel to the axial direction and two planes substantially parallel to end-walls of said body section, thereby defining a hollow section, wherein said hollow section comprises, in cross-section, a pair of substantially parallel lines and a pair of opposed circular sections.

* * * * *

UNITED STATES PATENT AND TRADEMARK OFFICE
CERTIFICATE OF CORRECTION

PATENT NO. : 4,960,221

DATED : October 2, 1990

INVENTOR(S) : Eiichi HIRAOKA et al.

It is certified that error appears in the above-identified patent and that said Letters Patent is hereby corrected as shown below:

On the title page, insert after Iftem [76],

--[73] Assignee: Sumitomo Heavy Industries, Ltd., Tokyo, Japan--.

Signed and Sealed this

Nineteenth Day of May, 1992

Attest:

DOUGLAS B. COMER

Attesting Officer

Acting Commissioner of Patents and Trademarks